US009002552B2

(12) United States Patent
Timmons et al.

(10) Patent No.: US 9,002,552 B2
(45) Date of Patent: Apr. 7, 2015

(54) COMPACT ELECTRIC RANGE EXTENDER FOR AN ELECTRIC VEHICLE

(75) Inventors: Adam T. Timmons, Southfield, MI (US); Kerem Koprubasi, Izmir (TR)

(73) Assignee: GM Global Technology Operations LLC, Detroit, MI (US)

(*) Notice: Subject to any disclaimer, the term of this patent is extended or adjusted under 35 U.S.C. 154(b) by 823 days.

(21) Appl. No.: 13/238,130

(22) Filed: Sep. 21, 2011

(65) Prior Publication Data

US 2013/0073128 A1 Mar. 21, 2013

(51) Int. Cl.
*B62M 6/45* (2010.01)
*B60L 11/12* (2006.01)
(Continued)

(52) U.S. Cl.
CPC .......... *B60L 11/126* (2013.01); *Y10T 29/49002* (2015.01); *B62M 6/45* (2013.01); *B60L 1/20* (2013.01); *Y02T 10/7077* (2013.01); *Y02T 10/7005* (2013.01); *B60L 7/14* (2013.01); *B60L 11/16* (2013.01); *B60L 11/1816* (2013.01); *B60L 15/2045* (2013.01); *B60L 2210/10* (2013.01); *B60L 2210/40* (2013.01); *B60L 2240/441* (2013.01); *B60L 2240/443* (2013.01); *B60L 2240/445* (2013.01); *Y02T 10/7241* (2013.01); *Y02T 10/7216* (2013.01);
(Continued)

(58) Field of Classification Search
USPC ............... 701/22; 29/592.1; 290/1 A, 1 R; 310/166; 307/10.1; 903/930, 903; 180/65.265, 65.28; 123/46 E
See application file for complete search history.

(56) References Cited

U.S. PATENT DOCUMENTS

| 2,454,360 A | 11/1948 | Ferguson et al. |
| 4,703,188 A | 10/1987 | Gottfried |

(Continued)

FOREIGN PATENT DOCUMENTS

| CN | 103010038 A | * | 4/2013 |
| DE | 102012215987 A1 | * | 3/2013 |

(Continued)

OTHER PUBLICATIONS

Investigation of a Novel Radial Magnetic-Field-Modulated Brushless Double-Rotor Machine Used for HEVs; Ping Zheng ; Jingang Bai ; Chengde Tong ; Yi Sui ; Zhiyi Song ; Quanbin Zhao; Magnetics, IEEE Transactions on; vol. 49 , Issue: 3 , Part: 2;DOI: 10.1109/TMAG.2012.2217347; Publication Year: 2013 , pp. 1231-1241.*

(Continued)

*Primary Examiner* — Cuong H Nguyen
(74) *Attorney, Agent, or Firm* — Quinn Law Group, PLLC

(57) ABSTRACT

An electric vehicle includes a transmission, motor, rechargeable energy storage system (RESS), auxiliary power unit (APU), and a controller. The APU has a pair of rings, at least one of which rotates with respect to the other. One ring is coaxial with and radially within the other. Ring rotation generates current in windings. A gear element is in driving connection with the rotatable ring. The APU includes an engine disposed radially within the inner ring, and a power takeoff mechanism coupled to the gear element. The controller energizes the APU to rotate a ring. A method includes positioning the APU in a vehicle body compartment, affixing an outer ring of windings to a compartment wall, and positioning a rotatable inner ring having permanent magnets radially within and coaxial with the outer ring. The engine is positioned radially within the inner ring. A power takeoff mechanism connects to the inner ring.

20 Claims, 2 Drawing Sheets

(51) Int. Cl.
*B60L 1/00* (2006.01)
*B60L 7/14* (2006.01)
*B60L 11/16* (2006.01)
*B60L 11/18* (2006.01)
*B60L 15/20* (2006.01)

(52) U.S. Cl.
CPC ............ *Y02T 10/6217* (2013.01); *Y02T 90/14* (2013.01); *Y02T 90/127* (2013.01); *Y02T 10/7283* (2013.01); *Y10S 903/903* (2013.01)

(56) References Cited

U.S. PATENT DOCUMENTS

| | | | | |
|---|---|---|---|---|
| 5,397,922 | A * | 3/1995 | Paul et al. | 290/1 A |
| 5,460,239 | A * | 10/1995 | Jensen | 180/302 |
| 6,230,670 | B1 | 5/2001 | Russell | |
| 6,911,757 | B2 | 6/2005 | Lopatinsky et al. | |
| 7,728,446 | B2 * | 6/2010 | Hofbauer et al. | 290/1 A |
| 8,942,877 | B2 * | 1/2015 | Morisaki | 701/22 |
| 2012/0245772 | A1 * | 9/2012 | King | 701/22 |
| 2013/0073128 | A1 * | 3/2013 | Timmons et al. | 701/22 |
| 2014/0039744 | A1 * | 2/2014 | Morisaki | 701/22 |
| 2014/0257607 | A1 * | 9/2014 | Van Maanen et al. | 701/22 |

FOREIGN PATENT DOCUMENTS

| | | | |
|---|---|---|---|
| GB | 2454360 A | | 6/2009 |
| NL | DE 102012215987 A1 * | | 3/2013 |

OTHER PUBLICATIONS

Research on electromagnetic performance of a novel radial magnetic-field-modulated brushless double-rotor machine; Ping Zheng ; Jingang Bai ; Chengde Tong ; Jia Lin ; Haipeng Wang; Electrical Machines and Systems (ICEMS), 2011 International Conference on; DOI: 10.1109/ICEMS.2011.6073503; Publication Year: 2011 , pp. 1-6.*

A novel power-train using coaxial magnetic gear for power-split hybrid electric vehicles; Linni Jian ; Guoqing Xu ; Yuanyuan Wu ; Zhou Cheng ; Jianjian Song; Electrical Machines and Systems (ICEMS), 2011 International Conference on; DOI: 10.1109/ICEMS. 2011.6073771; Publication Year: 2011 , pp. 1-6.*

* cited by examiner

COMPACT ELECTRIC RANGE EXTENDER FOR AN ELECTRIC VEHICLE

TECHNICAL FIELD

The present disclosure relates to auxiliary electric power generation aboard an electric vehicle.

BACKGROUND

Electric vehicles use a high-voltage electric traction motor to deliver motor torque at levels sufficient for launching and propelling the vehicle. Electrical energy is alternatively stored in and drawn from a rechargeable energy storage system (RESS). The RESS is typically recharged during operation via regenerative braking or another regenerative event. When the vehicle is parked, the RESS may be charged using an off-board power source such as a wall outlet or charging station. Unlike hybrid electric vehicles that can rely on an internal combustion engine to provide engine torque for propelling the vehicle, electric vehicles are range-limited by the stored energy in the RESS.

SUMMARY

An electric vehicle is disclosed herein. The electric vehicle has an auxiliary power unit (APU). The APU is turned on as needed to generate electrical energy, and to thereby extend the vehicle's range. Use of the present APU, which is configured and packaged as set forth herein, can help reduce range anxiety by enabling some level of electric travel when available energy of an onboard energy storage system (RESS) drops below a threshold, e.g., by allowing an operator to drive to a power outlet or charging station.

In particular, an electric vehicle is disclosed herein which includes a transmission, an electric traction motor, the APU, a RESS, and a controller. The traction motor has a motor output shaft which is mechanically coupled to an input member of the transmission. The transmission is powered solely by electrical energy from the traction motor.

The APU includes a pair of rings. One ring may be connected or grounded to a stationary surface of the vehicle, such as a wall of a spare tire bay or other compartment. Another ring, or optionally both rings, can rotate whenever the engine is fueled. A gear element in driving connection with the inner ring, and with the engine itself.

The engine can be of various configurations as set forth herein. Whatever the configuration, the engine has a reduced axial dimension, for instance a pancake-style or flattened design, and is disposed radially within the innermost ring. A power takeoff mechanism of, or connected to, the engine is mechanically coupled to the gear element, such as via a drive belt, chain, a clutch, or other direct or intermittent connection device. The controller is in electrical communication with the APU and the RESS, and selectively energizes the APU via the RESS when the level of available energy of the RESS falls below a calibrated threshold.

A method is also disclosed which includes positioning an auxiliary power unit (APU) in a compartment defined by a body of an electric vehicle. This step includes affixing an outer ring of induction windings to a wall of the compartment, positioning a rotatable inner ring having permanent magnets radially within and coaxial with the outer ring, and positioning an internal combustion engine radially within the rotatable inner ring. Thereafter, the method includes connecting a power takeoff mechanism of the engine to the rotatable inner ring.

The above features and advantages and other features and advantages of the present invention are readily apparent from the following detailed description of the best modes for carrying out the invention when taken in connection with the accompanying drawings.

DESCRIPTION

Figure 1:
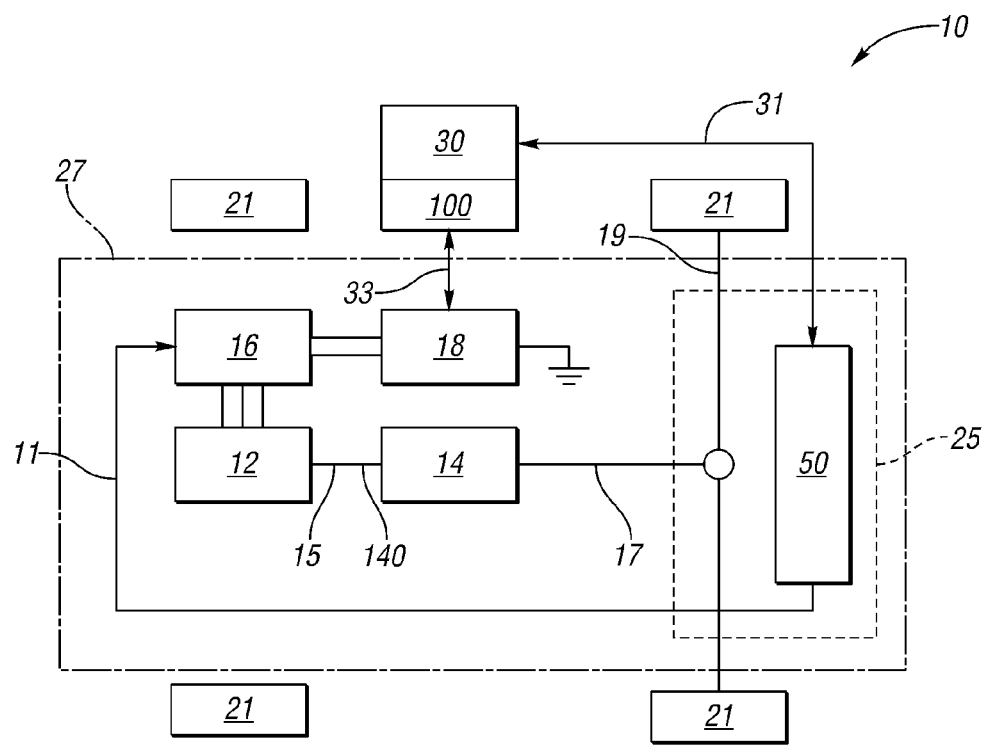
FIG. 1 is a schematic block diagram illustration of an example electric vehicle having an auxiliary power unit (APU) which can be selectively operated to extend the vehicle's electric range.
Figure 2:
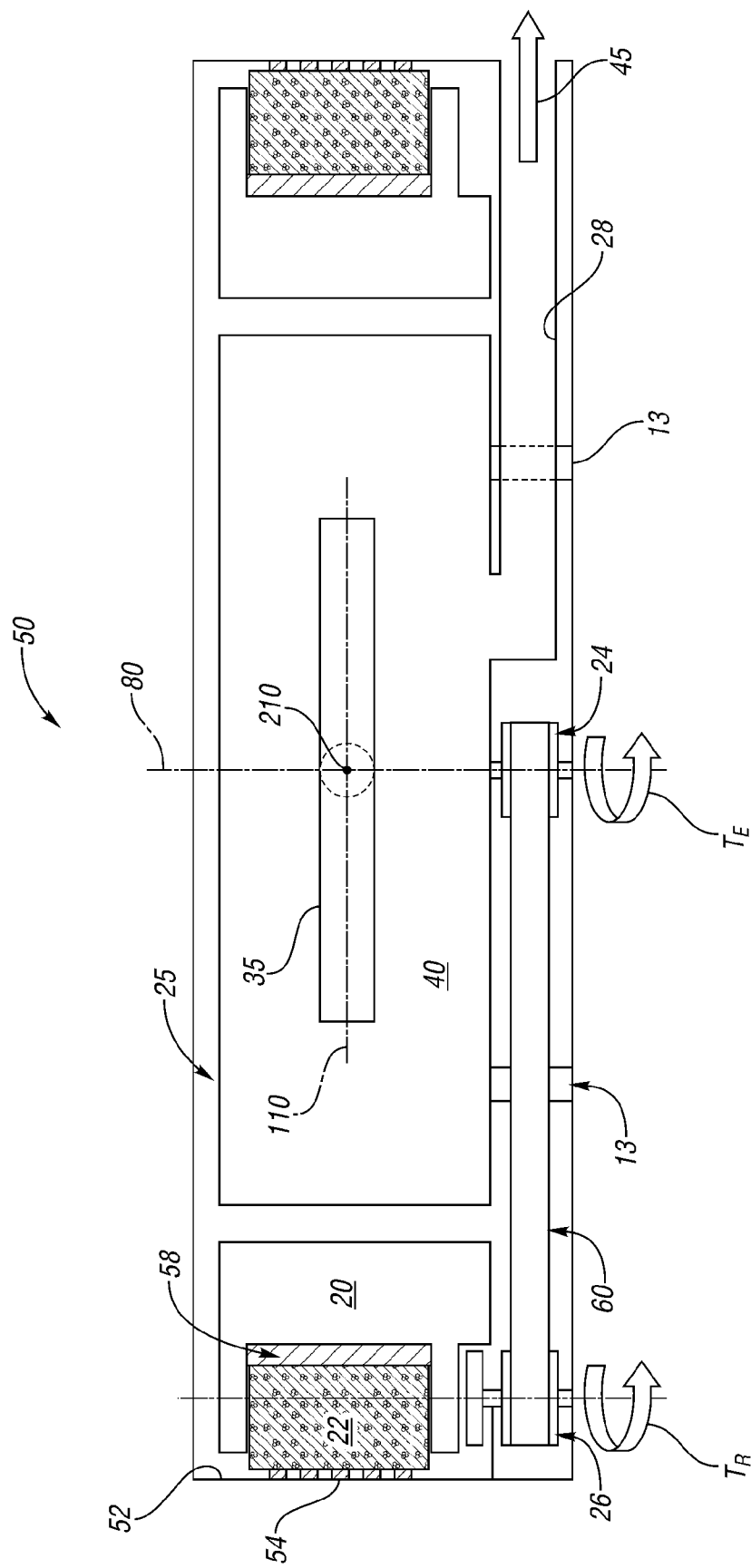
FIG. 2 is a schematic illustration of an example APU usable with the electric vehicle shown in FIG. 1.

Referring to the drawings, wherein like reference numbers correspond to like or similar components throughout the several figures, an electric vehicle 10 is represented schematically in FIG. 1. The vehicle 10 includes an auxiliary power unit (APU) 50, an example of which is shown in FIG. 2 and described in detail below. Additionally, the vehicle 10 includes an electric traction motor 12 having a motor output shaft 15 coupled to an input member 140 of a transmission 14. Torque from the traction motor 12 ultimately drives wheels 21 of one or more drive axles 19 via an output member 17 of the transmission 14.

The electric vehicle 10 includes a body 27 which defines a compartment 25. In a particular embodiment, the APU 50 may be disposed fully within the compartment 25. In a non-limiting example embodiment, the compartment 25 may be a spare tire bay located within a rear or trunk portion of the vehicle 10, or in another suitable location. Alternatively, the APU 50 may be connected below or above the vehicle 10 outside of the body 27 using suitable support structure (not shown).

The APU 50 may be configured with limited axial space, for instance an axially flattened/pancake-style device fitting within the relatively shallow confines of a spare tire bay. In other words, the APU 50 has a low aspect ratio mounting scheme sufficient for mounting or positioning the APU 50 aboard the vehicle 10 at a position which otherwise might house a spare tire or other cargo, or for mounting in space-limited locations otherwise unoccupied by propulsion components.

The electric traction motor 12 may be configured as a poly-phase machine, e.g., approximately 60VAC to approximately 300VAC or more depending on the embodiment. In such an embodiment, the fraction motor 12 may be electrically connected to a rechargeable energy storage system (RESS) 18 via a power inverter module (PIM) 16, which ultimately converts AC power generated by the traction motor 12 or during regenerative braking into DC power suitable for storage in the RESS 18.

Other embodiments may configure the traction motor 12 as a DC motor which does not require the PIM 16. In any embodiment, an auxiliary power module (APM) or DC-DC converter (not shown) may be used to provide the required DC output voltage to the various devices, as understood in the art. However configured, the RESS 18 can selectively receive energy (arrow 11) from the APU 50 as determined by an onboard controller 30.

Still referring to FIG. 1, the controller 30 is in communication with the APU 50 via closed and/or open-loop control and feedback signals (arrow 31). The controller 30 may be configured as one or more digital computers having a central processing unit (CPU) as well as sufficient read-only memory (ROM), flash memory, random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. The controller 30 may include instructions suitable for executing the present method 100 (see FIG. 3), and for determining the available level of energy in the RESS 18, e.g., by receiving signals (arrow 33) indicative of such remaining energy, whether such a level is measured, calculated, or otherwise determined.

Referring to FIG. 2, an example APU 50 is shown schematically to include an axially-reduced engine 40. The engine 40 is disposed radially within a pair of concentric rings 20, 22. At least one of the rings 20, 22 may be allowed to rotate with respect to the other, with the identity of the actual rotating ring being dependent on the design. In one possible embodiment, the ring 22 may be fixed to a stationary member of the vehicle 10 of FIG. 1, e.g., a radial wall 52 of the compartment 25 shown in FIG. 1. The ring 22 may be affixed via weld spots 54 or other suitable means. In this embodiment, the ring 20 is disposed radially within and coaxially-aligned with the ring 22. Therefore, for added clarity the ring 20 will be referred to hereinafter as the inner ring 20, and the ring 22 will be referred to hereinafter as the outer ring 22.

In the embodiment shown, the inner ring 20 includes a plurality of permanent magnets 58. The magnets 58 are oriented toward the outer ring 22. The outer ring 22 includes, or is formed as, a set of conductive coils or induction windings. Rotation of the inner ring 20, by way of example, generates electrical current in the induction windings of, or forming the entirety of, the inner ring 20. The opposite effect would occur in an embodiment in which the outer ring 22 is allowed to rotate and the inner ring 20 is held stationary, as is well understood in the art. The generated current is ultimately transmitted to the PIM 16 and/or the RESS 18 of FIG. 1 as electrical energy (arrow 11) as shown in the same Figure. The inner ring 20 may be optionally configured with air ducting fins (not shown) or channels to allow air to freely circulate during rotation of the inner ring 20, thus cooling the engine 40.

The engine 40 of FIG. 2 includes a power takeoff mechanism 24, for instance a rotatable pulley or gear set, which rotates about an axis of rotation 80 with an engine torque (arrow $T_E$). Engine mounts 13 may be used to support the weight of the engine 40. The power takeoff mechanism 24 is mechanically coupled to a gear element 26, such as via an example chain or drive belt 60, or intermittently, e.g., via a clutch, such that rotation of the power takeoff mechanism 24 ultimately rotates the gear element 26 with a rotor torque (arrow $T_R$). The gear element 26 may be splined or otherwise meshed with the inner ring 20 to provide a sufficient driving engagement.

Various embodiments are possible for the present engine 40. Packing and weight are important design concerns. Thus, the compartment 25 may at least partially define a channel 28 between the engine 40 and the ambient, e.g., a conduit, pipe, or other fully enclosed passage. Such a channel 28 or multiple such channels 28 may be configured facilitate exhaust (arrow 45), air intake, fuel feed, and/or engine cooling.

In an example embodiment, the engine 40 may be a heat engine which includes a plurality of cylinders 35. Each of the cylinders 35 may have a longitudinal axis 110, 210 which intersects the axis of rotation 80 of the power takeoff mechanism 24. Such an engine 40 may include multi-cylinder inline or flat "V" or "W" style piston cylinder engine. Alternatively, one may forego use of the piston/cylinder approach and instead use a Wankel-type rotary engine. As understood in the art, such an engine uses a 3-lobed rotor design and eccentric shafts, somewhat in the manner of a gerotor assembly, in order to convert pressure into rotational torque without using pistons.

Other possible embodiments may include single cylinder engines, steam-driven engines, or turbine-driven devices. Indeed, a piston-driven heat engine of any number of cylinders may be feasible. Examples include a single, V-twin, or flat 3 or 4 cylinder engine, the latter two cases with a 90' power takeoff rotation angle changing gear for proper coupling to the gearing system that conveys heat engine rotation to ring rotation. Energy conversion devices may be used such as an external combustion engine or a turbine. In a turbine example, where the turbine may be powered by internal fluid pressurization, e.g., via combustion, external fluid pressurization using external combustion, or a pre-pressurized tank of pressurized air.

Figure 3:
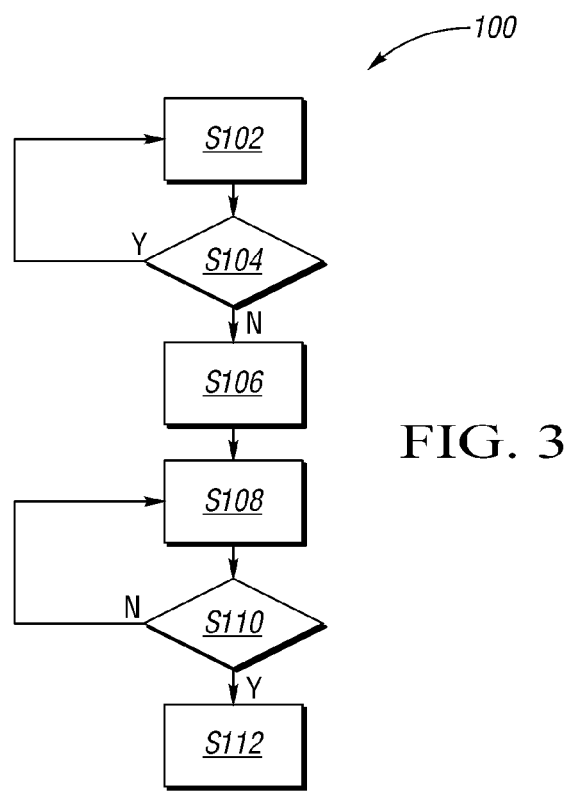
FIG. 3 is a flow chart describing an example method for selectively extending the electric range of the vehicle of FIG. 1 using the APU shown in FIG. 2.

Referring to FIG. 3, an example method 100 is shown for selectively extending the electric operating range of the electric vehicle 10 shown in FIG. 1 or any vehicle equipped with the APU 50 shown in FIG. 2. The method 100 begins with step S102, wherein the APU 50 is positioned in a compartment defined by a body of an electric vehicle, e.g., a spare tire bay. Step S102 may entail affixing at least one of the rings 20 and/or 22 to a stationary member, e.g., fixing the outer ring 22 of induction windings to a wall 52 of the compartment 25 as shown in FIG. 2. The windings are then connected to the RESS 18, with step S102 including positioning the inner ring 20 with its permanent magnets radially within and coaxial with the outer ring 22. Step S102 may also include positioning engine 40 radially within the rotatable inner ring 20, and then connecting the power takeoff mechanism 24 of the engine 40 to the rotatable inner ring 20.

At step S104, the controller 30 of FIG. 1 determines the available energy in the RESS 18, e.g., by measuring or calculating this value. The controller 30 compares the available energy of the RESS 18 to a calibrated threshold, which may be recorded in memory of the controller 30. The controller 30 repeats step S102 if the detected or calculated energy value exceeds the calibrated threshold. Otherwise, the controller 30 proceeds to step S106.

At step S106, the controller 30 cranks and starts the engine 40 of FIG. 1, and then begins fueling the engine 40. The controller 30 executes step S108 once the engine 40 is running at a sufficiently stable speed.

At step S108, the controller 30 of FIG. 1 begins allowing generated electrical energy (arrow 11) to be delivered to the traction motor 12. Depending on the embodiment, this may occur directly, or it may occur indirectly via the RESS 18 and/or the PIM 16. Once the traction motor 12 is powered in this manner, the method 100 proceeds to step S110.

At step S110, the controller 30 determines if the vehicle 10 of FIG. 1 has stopped. If so, the method 100 proceeds to step S112. Otherwise, the method 100 repeats step S108.

At step S112, the controller 30 may execute any number of control actions depending on the status of the vehicle 10 at its standstill. For instance, if the vehicle 10 is stopped and turned off, connected to a charging outlet, the controller 30 may automatically shut down the engine 40. The engine on/off status may be tied to the key on/off position in such an embodiment. If the vehicle 10 is merely stopped at a traffic light, the controller 30 may continue to generate electrical energy (arrow 11), directing any excess energy to the RESS 18 for storage.

Various benefits of the presently disclosed design will be readily apparent to one of ordinary skill in the art upon reading the above disclosure. One significant benefit is the fact that angular momentum can be stored in a rotating mass, i.e., one or both of the rings 20, 22, in the manner of a flywheel. A mechanical coupling between a mechanical energy source and the ring can thus be used to store mechanical energy. For instance, a regenerative braking event traditionally requires a battery pack to be oversized, and must absorb high-current regenerative charge pulses. A battery pack could be sized with more attention to cost reduction if the high-current charge pulses could be used to energize rotation of the present ring(s) 20 and/or 22, thus storing the energy from the regenerative event on the ring(s) of the APU 50 for slower return to the RESS 18.

The same can be said for any another event where mechanical energy can be converted back into electrical energy and delivered directly back to the PIM 16 or the traction motor 12, thus treating the APU 50 like an electrical energy storage device. Another significant benefit is the ability to engineer the shape of the ring(s) 20, 22 so as to act as a squirrel cage-like fan that could be used to help cool the APU 50, perhaps entirely if such a design utilizes an external combustion engine or a very efficient internal combustion engine.

While the best modes for carrying out the invention have been described in detail, those familiar with the art to which this invention relates will recognize various alternative designs and embodiments for practicing the invention within the scope of the appended claims.

The invention claimed is:

1. An electric vehicle comprising:
a transmission having an input member;
an electric traction motor having a motor output shaft that is mechanically coupled to the input member;
a rechargeable energy storage system (RESS) that is electrically connected to the electric traction motor;
an auxiliary power unit (APU) having:
a set of induction windings;
an outer ring;
an inner ring that is coaxial with and positioned radially within the outer ring, wherein at least one of the outer and inner rings is rotatable with respect to the other to thereby generate an electrical current in the set of induction windings;
a gear element in driving connection with the outer or inner ring that is rotating;
an engine that is disposed radially within the inner ring, and that includes a power takeoff mechanism that is mechanically coupled to the gear element; and
a controller in electrical communication with the APU and the RESS;
wherein the controller is operable for determining when a level of available energy in the RESS drops below a calibrated threshold, and for selectively energizing the APU to generate electrical power via the rotation of at least one of the outer and inner rings whenever the available energy in the RESS drops below the calibrated threshold.

2. The electric vehicle of claim 1, wherein the power takeoff mechanism has an axis of rotation which is coaxial with an axis of rotation of the inner ring.

3. The electric vehicle of claim 1, wherein:
one of the outer and inner rings is fixed;
the induction windings are connected to or formed as the ring that is fixed; and
the ring that rotates includes a plurality of permanent magnets oriented toward the induction windings.

4. The electric vehicle of claim 1, further comprising a chain or drive belt which directly connects the power takeoff mechanism to the gear element.

5. The electric vehicle of claim 1, wherein the electric vehicle includes a body which defines a compartment, and wherein the APU is positioned fully within the compartment.

6. The electric vehicle of claim 5, wherein the compartment is a spare tire bay which at least partially defines a channel from the engine to the ambient.

7. The electric vehicle of claim 1, wherein the engine is a piston-driven heart engine having a plurality of cylinders.

8. The electric vehicle of claim 7, wherein the cylinders are arranged in a circular configuration such that the longitudinal axis of each cylinder intersects the axis of rotation of the outer and inner rings.

9. The electric vehicle of claim 1, wherein the engine is a Wankel engine.

10. An auxiliary power unit (APU) for an electric vehicle having a transmission, an electric traction motor having a motor output shaft that is mechanically coupled to an input member of the transmission, and a rechargeable energy storage system (RESS) that is electrically connected to the electric traction motor, the APU comprising:
a set of induction windings;
an outer ring and an inner ring, one of which is rotatable with respect to the other, wherein a rotation of the at least one ring generates an electrical current in the set of induction windings;
a gear element in driving connection with the ring that one of the outer and inner rings that rotates; and
an engine disposed radially within the inner ring;
wherein the engine includes a power takeoff mechanism which is mechanically coupled to the gear element for powering the ring that rotates.

11. The APU of claim 10, further comprising:
a controller in communication with the APU and the RESS, wherein the controller is configured for selectively energizing the APU to thereby power the ring that rotates via the power takeoff mechanism whenever a level of available energy in the RESS drops below a calibrated threshold.

12. The APU of claim 10, wherein the power takeoff mechanism has an axis of rotation which is coaxial with an axis of rotation of the ring that rotates.

13. The APU of claim 10, wherein:
one of the rings is fixed;
the induction windings are connected to or formed as part of the fixed ring; and
the ring that rotates includes a plurality of permanent magnets oriented toward the induction windings.

14. The APU of claim 10, further comprising a chain or drive belt which directly connects the power takeoff mechanism to the gear element.

15. The APU of claim 10, wherein the electric vehicle includes a body which defines a spare tire bay, and wherein the spare tire bay at least partially defines a channel between the engine and the ambient.

16. The APU of claim 10, wherein the engine has a plurality of cylinders arranged in a circular configuration such that the longitudinal axis of each cylinder intersects the axis of rotation of the power takeoff mechanism.

17. The APU of claim 10, wherein the engine is a Wankel-type engine.

18. A method comprising:
   positioning an auxiliary power unit (APU) in a compartment defined by a body of an electric vehicle, including:
   affixing an outer ring of induction windings of the APU to a wall of the compartment;
   positioning a rotatable inner ring of the APU having permanent magnets radially within and coaxial with the outer ring;
   positioning an internal combustion engine radially within the rotatable inner ring; and
   connecting a power takeoff mechanism of the engine to the rotatable inner ring of the APU.

19. The method of claim 18, further comprising:
   determining, via a controller, a level of available energy in a rechargeable energy storage system (RESS) of the electric vehicle;
   comparing the level of remaining energy of the RES S to a calibrated threshold; and
   selectively energizing the engine to thereby rotate the inner ring via the power takeoff mechanism whenever the level of remaining energy of the RES S falls below the calibrated threshold.

20. The method of claim 18, further comprising: providing a channel between the engine and the ambient that is at least partially defined by a wall of the spare tire bay.

\* \* \* \* \*